United States Patent [19]
Lee

[11] Patent Number: 5,798,868
[45] Date of Patent: Aug. 25, 1998

[54] PROJECTION LENS

[75] Inventor: Seung Gyu Lee, Seoul, Rep. of Korea

[73] Assignee: LG Electronics Inc., Seoul, Rep. of Korea

[21] Appl. No.: 937,585

[22] Filed: Sep. 29, 1997

Related U.S. Application Data

[63] Continuation of Ser. No. 432,710, May 2, 1995, abandoned.

[30] Foreign Application Priority Data

May 2, 1994 [KR] Rep. of Korea ............... 9651/1994

[51] Int. Cl.$^6$ .................................................... G02B 9/00
[52] U.S. Cl. ................................................................. 359/649
[58] Field of Search .............................................. 359/649–651

[56] References Cited

U.S. PATENT DOCUMENTS 5,066,113  11/1991  Nakajima et al. .................. 359/649
5,130,850   7/1992  Toida ................................... 359/649

Primary Examiner—Scott J. Sugarman

[57] ABSTRACT

An improved projection lens capable of advantageously decreasing a distortional aberration by providing a longer back focal length, which includes which includes a first lens group including a concave lens and a plurality of convex lenses, which are formed in order from a screen; a light amount control member formed on an optical axis and behind the first lens group for controlling the amount of light transmitted from the first lens group; a second lens group formed on the optical axis behind the light amount control member; a third lens group formed on the optical axis and behind the light amount control member and including a plurality of lenses; and a block formed on the optical axis and behind the third lens group for adjusting a focal distance.

12 Claims, 6 Drawing Sheets

SPHERICAL ABERRATION

ASTIGMATISM

DISTORTION

SPHERICAL ABERRATION

ASTIGMATISM

DISTORTION

: 1

PROJECTION LENS

This application is a continuation, of application Ser. No. 08/432,710 filed on May 2, 1995, now abandoned.

BACKGROUND OF THE INVENTION

1. Field of the Invention

The present invention relates to a projection lens, and more particularly to an improved projection lens capable of advantageously decreasing a distortional aberration by providing a longer back focal length.

2. Description of the Conventional Art

Referring to FIG. 1, there is shown a construction of a conventional color liquid crystal display type projector, which includes a light source 10, a plurality of full reflection lenses 11a, 11b, 11c, a plurality of liquid crystal display devices 12a, 12b, 12c, a plurality of blue light reflection mirrors 13a and 13b, a red light transmission mirror 14, a red light reflection mirror 15, and a projection lens 16 consisting of a plurality of lenses. A light advanced to the projection lens 16 is displayed on the screen 17.

Referring to FIG. 2, the construction of a conventional projection lens 16 having the first through fourth lens groups for the conventional color liquid crystal display type projector will now be explained.

To begin with, the first lens group includes a plurality of lenses, each of which has a radius of curvature R1 through R6. The second lens group includes a plurality of lenses, each of which has a radius of curvature R7 through R11. The third lens group includes a plurality of lenses, each of which has a radius of curvature R12 through R15. The fourth lens group includes a plurality of lenses, each of which has a radius of curvature R16 through R22.

In the conventional color liquid crystal display type projector, since there are provided a plurality of full reflection mirrors 11a, 11b, 11c, a plurality of liquid crystal display devices 12a, 12b, 12c, a plurality of red light mirrors 13a, 13b, a red light transmission mirror 14, and a red light reflection mirror 15, a longer back focus length is required for mixing or separating a light coming from the light source 10.

Conventionally, when a back focus length is lengthy, a distortional aberration exceeds −2% as shown in FIG. 3. That is, as shown in FIG. 4, every corner of screen is outwardly extended.

Particularly, as shown in FIG. 5, in case of performing a multi-screen system using a conventional projection lens 16, parts between screens are overlapped. In addition, since the number of lenses which comprise the projection lens is 12, a negative power lens group is provided at a position nearest to the screen and a positive power lens group is provided at a position furthest from the screen in order to elongate the back-focus in case of performing a multi-screen system, the connected portion is not a straight line and the parts between the screens are overlapped.

SUMMARY OF THE INVENTION

Accordingly, it is an object of the present invention to provide a projection lens, which overcome the problems encountered in the conventional projection lens.

It is another object of the present invention to provide an improved projection lens capable of advantageously decreasing a distortional aberration by providing a longer back focal length.

To achieve the above objects, there is provided a projection lens, which includes a first lens group including a concave lens group and a convex lens group having a plurality of lenses, which are formed in order from a screen; a light amount control member formed on an optical axis and behind the first lens group for controlling the amount of light transmitted from the first lens group; a second lens group formed on the optical axis behind the light amount control member; a third lens group formed on the optical axis and behind the light amount control member and including a plurality of lenses; and a block formed on the optical axis and behind the third lens group for adjusting a focal distance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
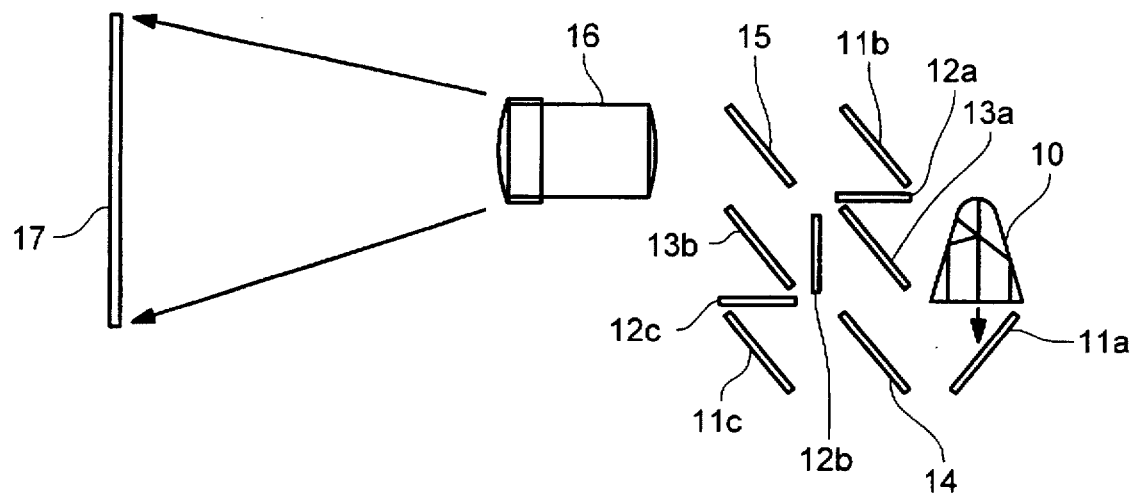
FIG. 1 is a schematic cross-sectional view showing a construction of a conventional color liquid crystal display type projector.
Figure 2:
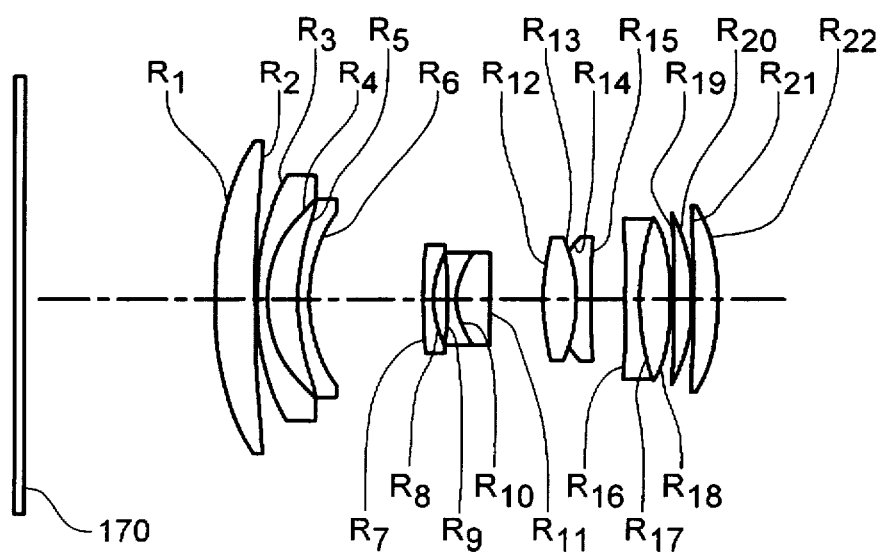
FIG. 2 is a cross-sectional view showing a conventional projection lens for the conventional color liquid crystal display type projector.
Figure 3A:
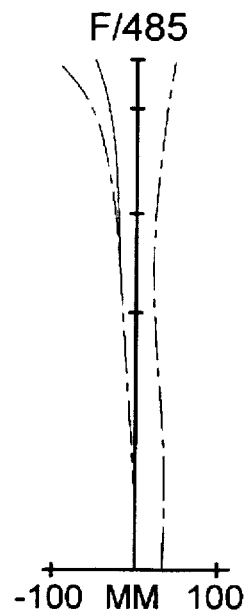
FIG. 3 is a graph showing a characteristic of a spherical aberration of a projection lens of a conventional color liquid crystal display.
Figure 3B:
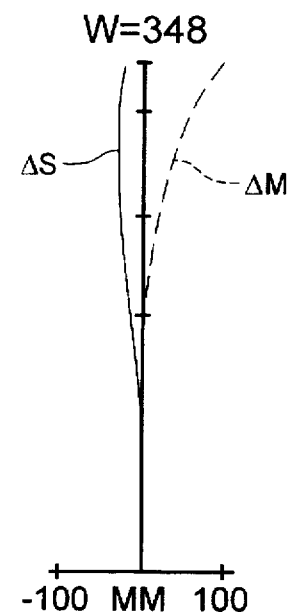
Figure 3C:
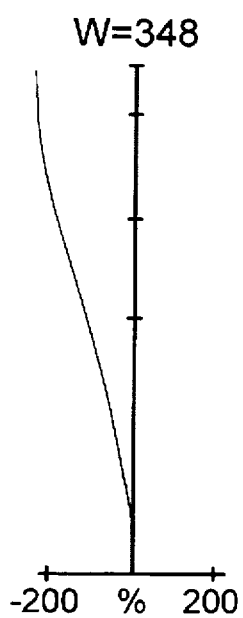
Figure 4:
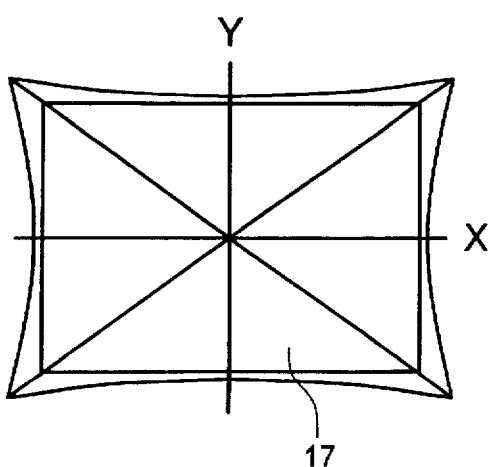
Figure 5:
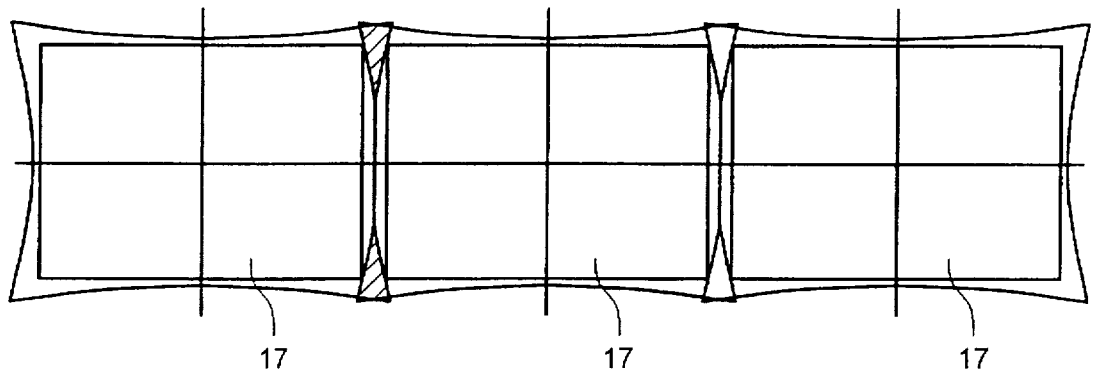
Figure 6:
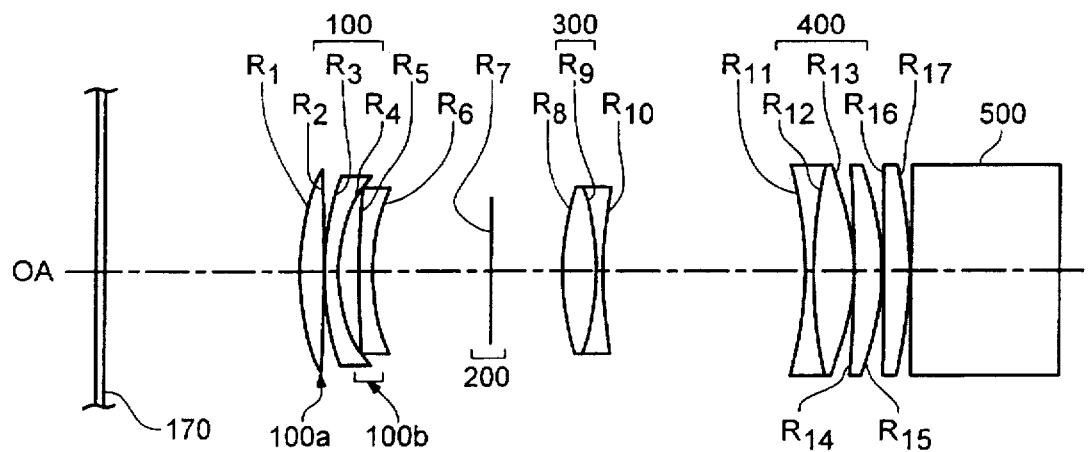
Figure 7:
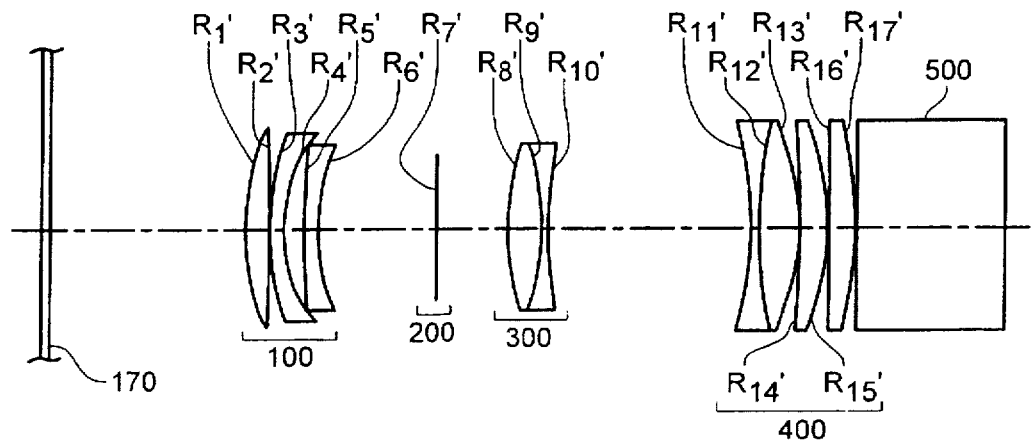
Figure 8A:
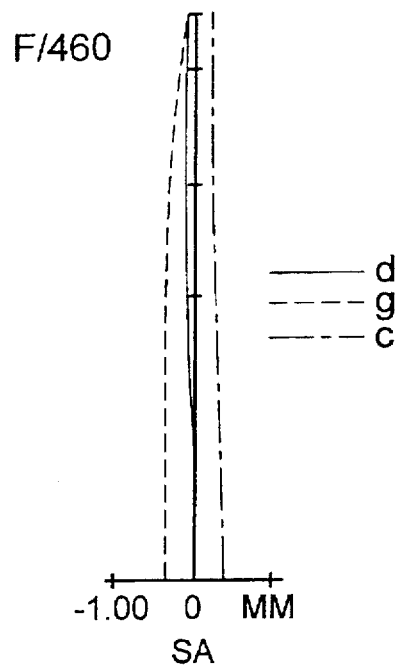
Figure 8B:
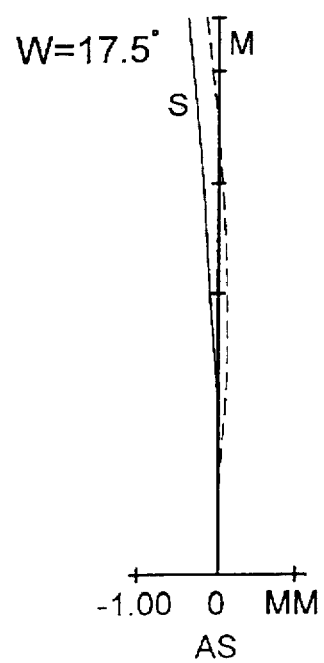
Figure 8C:
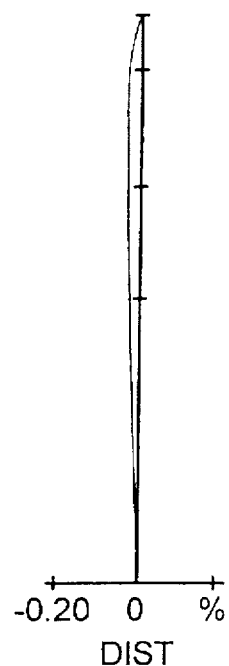
Figure 9A:
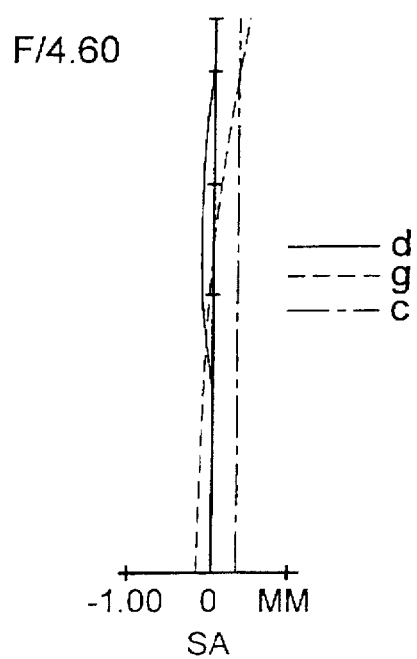
Figure 9B:
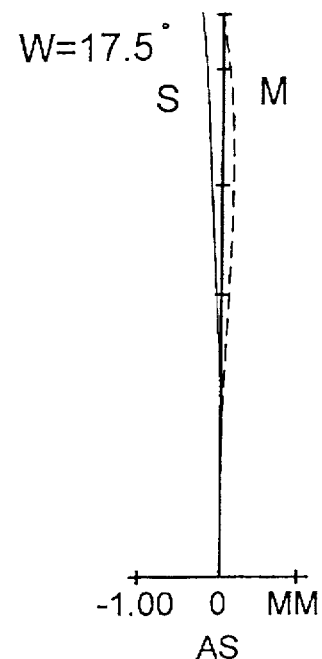
Figure 9C:
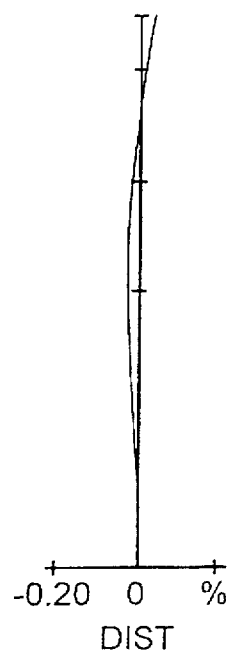

a graph showing a characteristic of an astigmatism of a projection lens of a conventional color liquid crystal display;

a graph showing a characteristic of a distortional aberration of a projection lens of a conventional color liquid crystal display;

FIG. 4 is a view of a screen effected by a distortional aberration of a projection lens of a conventional color liquid display;

FIG. 5 is a front view showing a multi-screen overlapping due to a distortional aberration lens of a conventional color liquid display;

FIG. 6 is a cross-sectional view of a construction of a color liquid crystal display type projection lens according to a first embodiment of the present invention;

FIG. 7 is a cross-sectional view of a construction of a color liquid crystal display type projection lens according to a second embodiment of the present invention;

FIG. 8A is a graph showing the spherical aberration of a color type liquid crystal display type projection lens according to the first embodiment of the present invention;

FIG. 8B is a graph showing an astigmatism of the color liquid crystal display type projection lens according to the first embodiment of the present invention;

FIG. 8C is a graph showing the distortional aberration of a color liquid crystal display type projection lens according to the first embodiment of the present invention;

FIG. 9A is a graph showing a spherical aberration of the color type liquid crystal display type projection lens according to the first embodiment of the present invention;

FIG. 9B is a graph showing an astigmatism of the color liquid crystal display type projection lens according to the first embodiment of the present invention;

FIG. 9C is a graph showing a distortional aberration of the color liquid crystal display type projection lens according to the first embodiment of the present invention.

DETAILED DESCRIPTION OF THE PREFERRED EMBODIMENTS

Referring to FIG. 6, there is shown a construction of a projection lens according to a first embodiment of the present invention. As shown therein, there is formed an optical axis OA and a screen 170. From the screen 170, there is formed in order a first lens group 100, a light amount control member 200, a second lens group 300, a third lens group 400, and a block 500 for adjusting a focusing distance.

The first lens group 100 includes a positive meniscus lens 100a having radii of curvatures R1 and R2, and two negative meniscus lenses 100b having radii of curvatures R3–R6.

The light amount controlling member 200 is formed for control the amount of light being transmitted from the first lens group 100 and has a radius of curvature R7.

The second lens group 300 includes a biconvex positive power lens and a biconcave negative power lens, having a radius of curvature R8 through R10. The third lens group 400 includes a plurality of positive power lenses and a plurality of negative power lenses, having a radius of curvature R11 through R17. Particularly, the third lens group 400 includes a biconcave lens, a biconvex lens, a positive meniscus lens, and a biconvex lens. In addition, the block 500 is formed behind the third lens group 400 on the optical axis OA.

Here, the first, second, third lens groups 100, 300 and 400 integrally move on the optical axis OA and perform a focusing operation.

In the above constructions, the following expressions can be obtained:

$$1.8 < fb/f \quad (1)$$

$$0.31 < -e/f1 < 0.41 \quad (2)$$

$$1.09 < -e/f1 < 1.32 \quad (3)$$

$$0.26 < -f/f2 < 0.42 \quad (4)$$

$$0.55 < -f1/f11 < 0.68 \quad (5)$$

where f is the entire focussing distance in the projection lens according to the present invention, f1 is the entire focussing distance in the first lens group 100, f2 is the entire focussing distance of the second lens group 300, e is the distance between the first lens group 100 and the second lens group 300, f11 is the focal distance between the screen 170 and the first lens in the first lens group 100, and fb is the distance between the last lens of the third lens group 400 and an imaging surface (not shown).

In addition, the first lens group 100 has at lest one positive power lens from the screen 170.

The second lens group 300 includes of a positive power lens and a negative power lens in order from the screen 170.

Generally, in a projection lens, there is formed an element for radiating light. Otherwise, the distance between the first lens group 100 and the second lens group 300 should become longer. This requires two lenses having a higher negative power. In the present invention, two concave lenses of the first lens group 100 are directed to radiate light and compensate the distortional aberration and the chromatic aberration by positioning the concave lens at the last location of the first lens group 100. Lights radiated by the first lens group 100 are controlled by the second lens group 300. In order to obtain a predetermined back focus length satisfying the expression (1), the distance between the second lens group 300 and the third lens group 400 is an important element. The ratio for the focal distance f1 against the focal distance f of the entire lens system should coincide with the ratio of the expression (3). The focal distance f2 of the second lens group 300 affects the entire length of the lens system and the back focus length. Here, if the positive power increases, the back focus length decreases, so that the ratio of the focal distance f2 of the second lens group 300 to the focal distance f of the entire lens system should satisfy the expression (4). Since the first lens group 100 for correcting most important in the distortional aberration of the projection lens for the color liquid crystal display type, it is important to properly position the first lens group 100 in order to decrease the value of a distortional aberration. That is, if the distortional aberration in the first lens group decreases, a pin cushion phenomenon in the projection lens system occurs which should be compensated by controlling the first lens group 100, so that the first lens group 100 is entirely formed in a form of Meniscus to have a higher power, thereby obtaining a form of a barrel at the screen 170. The ratio between the focal distance f11 of the concave lens and the focal distance f1 for the first lens group 100 should satisfy the expression (5) for compensating the distortional aberration.

In the drawings, S denotes a Sagittal astigmatism, and M denotes a Meridional astigmatism.

FIGS. 8A–9C show the percentage of lens defects (e.g., aberration, astigmatism, distortion) of light rays passing through different portions of a lens, wherein the vertical axis represents the radius of the lens, "0" represents the center of the lens, and the top of the vertical axis denotes the outer edge of the lens. As shown in the figures, such defects depend on the wavelength of the light rays passing through the lens. Here, the standard wavelengths, e.g., d=587.6 nm, g=435.8 nm, and c=656.3 nm, are used. FIGS. 9A–9C show lens defects as shown in FIGS 8A–8C for a lens system having different characteristics.

In the above projection lens, the first embodiment according to the present invention has the following results wherein f is 141.51 mm, Fno is 4.60, W is 17.5, fb is 255.28 mm including a block having the thickness t of 37 mm, and n is 1.417.

| Radius of curvature R1–R17 | Thickness T1–T17 | Refractive ratio | Dispersion |
|---|---|---|---|
| 1. | 92.50 | 5.30 | 1.48749 | 70.4 |
| 2. | 911.90 | 0.20 | | |
| 3. | 72.00 | 3.20 | 1.58913 | 61.3 |
| 4. | 38.54 | 5.50 | | |
| 5. | 150.00 | 3.00 | 1.58913 | 61.3 |
| 6 | 56.04 | 27.00 | | |
| 7 | infinite | 25.00 | | |
| 8. | 82.50 | 8.20 | 1.62588 | 35.7 |
| 9. | −82.50 | 2.30 | 1.63854 | 55.5 |
| 10. | 117.10 | 50.00 | | |
| 11. | −115.00 | 2.80 | 1.69895 | 30.1 |
| 12. | 189.00 | 9.00 | 1.48749 | 70.4 |
| 13. | −83.40 | 0.20 | | |
| 14. | −265.00 | 6.20 | 1.48749 | 70.4 |
| 15. | −89.95 | 0.20 | | |
| 16. | 915.00 | 6.00 | 1.48749 | 70.4 |
| 17. | −138.30 | | | |

In the above chart, R1–R17 are radius of curvatures of lenses in the first, second and third lens groups. Ti is a thickness between R1 and R2, T2 is between R2–R3, T3 is between R3–R4, T4 is between R4–R5, T5 is between R5'~R6', T6' is between R6'~R7', T7' is between R7'~R8', T8' is between R8'~R9', T9' is between R9'~R10', T10' is between R10'~R11', R11' is between R11'~R12', T12' is between R12'~R13', T13' is between R13'~R14', T14' is between R14'~R15', T15' is between R15'~R16', and T16' is between R16'~R17'.

The second embodiment as shown in FIG. 7 according to the present invention has the following results wherein f is 141.67 mm, Fno is 4.60, fb is 255.33 mm including a block having the thickness t of 37 mm, and n is 1.417.

| Radius of curvature R1'~R17' | Thickness T1'~T17' | Refractive ratio | Dispersion |
|---|---|---|---|
| 1. | 75.50 | 5.30 | 1.48749 | 70.4 |
| 2. | 562.80 | 0.20 | | |
| 3. | 72.00 | 3.20 | 1.58913 | 61.3 |
| 4. | 37.17 | 5.50 | | |
| 5. | 163.00 | 3.00 | 1.58913 | 61.3 |
| 6. | 51.49 | 25.50 | | |
| 7. | infinite | 25.30 | | |
| 8. | 82.50 | 8.20 | 1.62588 | 35.7 |
| 9. | −82.50 | 2.30 | 1.63854 | 55.5 |
| 10. | 130.00 | 50.00 | | |
| 11. | −113.50 | 2.80 | 1.69895 | 30.1 |
| 12. | 180.00 | 9.00 | 1.48749 | 70.4 |
| 13. | −78.20 | 0.20 | | |
| 14. | −265.00 | 6.20 | 1.48749 | 70.4 |
| 15. | −87.50 | 0.20 | | |
| 16. | 915.00 | 6.00 | 1.48749 | 70.4 |
| 17. | −157.39 | | | |

In the above chart, R1'~R17' are radius of curvatures of lenses in the first, second and third lens groups. T1' is a thickness between R1' and R2'. T2' is between R2'~R3'. T3' is between R3'~R4'. T4' is between R4'~R5'. T5' is between R5'~R6'. T6' is between R6'~R7'. T7' is between R7'~R8'. T8' is between R8'~R9'. T9' is between R9'~R10'. T10' is between R10'~R11'. R11' is between R11'~R12'. T12' is between R12'~R13'. T13' is between R13'~R14'. T14' is between R14'~R15'. T15' is between R15'~R16'. and T16' is between R16'~R17'.

As described above, the present invention is directed to provide an improved projection lens capable of advantageously decreasing a distortional aberration by providing a longer back focal length, thereby preventing a pin cushion phenomenon and screen overlapping when using a multi projection system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection lens, comprising:

a first lens group including a positive meniscus lens, a negative meniscus lens, and a negative meniscus lens, which are formed in order from a screen;

a light amount control member formed on an optical axis and behind said first lens group for controlling an amount of light being transmitted from said first lens group;

a second lens group including a biconvex lens and a biconcave lens and formed on said optical axis and behind said light amount control member;

a third lens group formed on said optical axis and behind the light amount control member and including a plurality of lenses; and a block formed on the optical axis and behind said third lens group for adjusting a focal distance.

2. The projection lens of claim 1, wherein said first, second, and third lens groups satisfy at least one of the following expressions:

$$1.8 < fb/f,$$

$$0.31 < -e/f1 < 0.41,$$

$$1.09 < -e/f1 < 1.32,$$

$$0.26 < -f/f2 < 0.42,$$

$$0.55 < -f1/f11 < 0.68,$$

where f is the entire focussing distance in the projection lens, f1 is the entire focussing distance in the first lens group, f2 is the entire focussing distance of the second lens group, e is the distance between the first lens group and the second lens group, f11 is the focusing distance of the positive meniscus lens in the first lens group, and fb is the distance between the last lens of the third lens group and an imaging surface in a projection lens system.

3. The projection lens of claim 1, wherein said first lens group includes at least one lens having a positive power.

4. The projection lens of claim 1, wherein said second lens group includes a positive lens power and a negative lens power in order from the screen.

5. The projection lens of claim 1, wherein said first, second, and third lens groups substantially satisfy the following results, wherein f is 141.51 mm, Fno is 4.60, W is 17.5, fb is 255.28 mm including a block having a thickness t of 37 mm, and n is 1.417:

| Radius of curvature R1~R17 | Thickness T1~T17 | Refractive ratio | Dispersion |
|---|---|---|---|
| 1. | 92.50 | 5.30 | 1.48749 | 70.4 |
| 2. | 911.90 | 0.20 | | |
| 3. | 72.00 | 3.20 | 1.58913 | 61.3 |
| 4. | 38.54 | 5.50 | | |
| 5. | 150.00 | 3.00 | 1.58913 | 61.3 |
| 6. | 56.04 | 27.00 | | |
| 7. | infinite | 25.00 | | |
| 8. | 82.50 | 8.20 | 1.62588 | 35.7 |
| 9. | −82.50 | 2.30 | 1.63854 | 55.5 |
| 10. | 117.10 | 50.08 | | |
| 11. | −115.00 | 2.80 | 1.69895 | 30.1 |
| 12. | 189.00 | 9.00 | 1.48749 | 70.4 |
| 13. | −83.40 | 0.20 | | |
| 14. | −265.00 | 6.20 | 1.48749 | 70.4 |
| 15. | −89.95 | 0.20 | | |
| 16. | 915.00 | 6.00 | 1.48749 | 70.4 |
| 17. | −138.30 | | | | where R1~R17 are radii of curvatures of lenses in the first, second and third lens groups, T1 is a thickness between R1 and R2, T2 is between R2~R3, T3 is between R3~R4, T4 is between R4~R5, T5 is between R5~R6, T6 is between R6~R7, T7 is between R7~R8, T8 is between R8~R9, T9 is between R9~R10, T10 is between R10~R11, T11 is between R11~R12, T12 is between R12~R13, T13 is between R13~R14, T14 is between R14~R15, T15 is between R15~R16, and T16 is between R16~R17.

6. The projection lens of claim 1, wherein said first, second, and third lens groups substantially satisfy the following results, wherein f is 141.67 mm, Fno is 4.60, fb is 255.33 mm including a block having a thickness t of 37 mm, and n is 1.417:

| Radius of curvature R1'–R17' | Thickness T1'–T17' | Refractive ratio | Dispersion |
|---|---|---|---|
| 1. 75.50 | 5.30 | 1.48749 | 70.4 |
| 2. 562.80 | 0.20 | | |
| 3. 72.00 | 3.20 | 1.58913 | 61.3 |
| 4. 37.17 | 5.50 | | |
| 5. 163.00 | 3.00 | 1.58913 | 61.3 |
| 6. 51.49 | 25.50 | | |
| 7. infinite | 25.30 | | |
| 8. 82.50 | 8.20 | 1.62588 | 35.7 |
| 9. −82.50 | 2.30 | 1.63854 | 55.5 |
| 10. 130.00 | 50.00 | | |
| 11. −113.50 | 2.80 | 1.69895 | 30.1 |
| 12. 180.00 | 9.00 | 1.48749 | 70.4 |
| 13. −78.20 | 0.20 | | |
| 14. −265.00 | 6.20 | 1.48749 | 70.4 |
| 15. −87.50 | 0.20 | | |
| 16. 915.00 | 6.00 | 1.48749 | 70.4 |
| 17. −157.39 | | | | where R1'–R17' are radii of curvatures of lenses in the first, second and third lens groups, T1' is a thickness between R1' and R2', T2' is between R2'–R3', T3' is between R3'–R4', T4' is between R4'–R5', T5' is between R5'–R6', T6' is between R6'–R7', T7' is between R7'–R8', T8' is between R8'–R9', T9' is between R9'–R10', T10' is between R10'–R11', T11' is between R11'–R12', T12' is between R12'–R13', T13' is between R13'–R14', T14' is between R14'–R15', T15' is between R15'–R16', and T16' is between R16'–R17'.

7. The projection lens of claim 2, wherein the plurality of lenses included in said third group are four in number.

8. The projection lens of claim 2, wherein the light amount control member has infinite radius of curvature.

9. The projection lens of claim 1, wherein the plurality of lenses in the third lens group include at least one of a biconcave lens, a biconvex lens, a positive meniscus lens, and a biconvex lens.

10. The projection lens of claim 1, wherein the plurality of lenses in the third lens group include a biconcave lens, a biconvex lens, a positive meniscus lens, and a biconvex lens.

11. The projection lens of claim 10, wherein the biconcave lens, the biconvex lens, the positive meniscus lens, and the biconvex lends of the third lens group are formed in that order from the screen.

12. The projection lens of claim 1, wherein a radius of curvature of the light amount control member is infinite.

* * * * *